(12) United States Patent
Yang

(10) Patent No.: US 11,372,812 B2
(45) Date of Patent: Jun. 28, 2022

(54) MOBILE DEVICE AND METHOD CAPABLE OF EARLIER DETERMINING THAT A NUMBER OF FILES IN A DIRECTORY OF AN EXTERNAL CONNECTED STORAGE DEVICE IS ABOUT TO FULL

(71) Applicant: Silicon Motion Inc., Hsinchu County (TW)

(72) Inventor: Shang-Ta Yang, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 282 days.

(21) Appl. No.: 16/590,386

(22) Filed: Oct. 2, 2019

(65) Prior Publication Data

US 2020/0110554 A1 Apr. 9, 2020

Related U.S. Application Data

(60) Provisional application No. 62/742,451, filed on Oct. 8, 2018.

(30) Foreign Application Priority Data

Aug. 21, 2019 (TW) .................................. 108129817

(51) Int. Cl.
*G06F 16/17* (2019.01)
*G06F 3/06* (2006.01)

(52) U.S. Cl.
CPC ........ *G06F 16/1727* (2019.01); *G06F 3/0679* (2013.01)

(58) Field of Classification Search
CPC .......................... G06F 16/1727; G06F 3/0679
See application file for complete search history.

(56) References Cited

U.S. PATENT DOCUMENTS

| | | | | |
|---|---|---|---|---|
| 5,940,841 | A * | 8/1999 | Schmuck | ............ G06F 16/1858 |
| 5,946,686 | A * | 8/1999 | Schmuck | ............ G06F 16/1858 |
| | | | | 707/783 |
| 6,725,321 | B1 * | 4/2004 | Sinclair | ................. G06F 3/0679 |
| | | | | 711/103 |
| 7,085,879 | B2 * | 8/2006 | Aasheim | ............. G06F 12/0246 |
| | | | | 707/999.103 |
| 7,325,017 | B2 * | 1/2008 | Tormasov | ............... G06F 16/10 |
| | | | | 707/822 |
| 7,840,617 | B2 * | 11/2010 | Ito | ....................... G06F 16/1847 |
| | | | | 707/822 |

(Continued)

FOREIGN PATENT DOCUMENTS

| | | |
|---|---|---|
| EP | 1 697 836 B1 | 6/2014 |
| TW | 200622619 | 7/2006 |

(Continued)

*Primary Examiner* — Debbie M Le
*Assistant Examiner* — Huen Wong
(74) *Attorney, Agent, or Firm* — Winston Hsu

(57) ABSTRACT

A method utilized in a mobile device includes: sending a file management command from the mobile device to a flash memory controller; receiving a file entry table from the flash memory controller; calculating a sum of data amounts of a plurality of entries corresponding to file(s) and/or sub-directory(s) in a specific directory; and comparing the sum of data amounts with a specific maximum data amount to determine a message reported to the specific application of the mobile device.

6 Claims, 4 Drawing Sheets

(56) References Cited

U.S. PATENT DOCUMENTS

| | | | |
|---|---|---|---|
| 2001/0051954 A1* | 12/2001 | Yamashita | G11B 27/329 |
| 2002/0090208 A1* | 7/2002 | Hatanaka | H04N 1/2112 |
| | | | 386/225 |
| 2003/0009484 A1* | 1/2003 | Hamanaka | G06F 16/10 |
| 2006/0015681 A1* | 1/2006 | Park | G06F 3/0676 |
| | | | 711/112 |
| 2006/0020744 A1* | 1/2006 | Sinclair | G06F 12/0246 |
| | | | 711/103 |
| 2006/0020745 A1* | 1/2006 | Conley | G06F 12/0246 |
| | | | 711/103 |
| 2006/0069665 A1* | 3/2006 | Yamakawa | H04L 67/1008 |
| 2006/0117135 A1* | 6/2006 | Thind | G06F 3/0653 |
| | | | 711/112 |
| 2006/0265605 A1* | 11/2006 | Ramezani | G06F 21/78 |
| | | | 713/193 |
| 2009/0083474 A1* | 3/2009 | Cooke | G06F 12/0223 |
| | | | 711/103 |
| 2010/0241677 A1* | 9/2010 | Oshima | G06F 16/1847 |
| | | | 707/824 |
| 2011/0072058 A1* | 3/2011 | Tang | G06F 9/5055 |
| | | | 707/823 |
| 2011/0218965 A1 | 9/2011 | Lee | |
| 2012/0290777 A1* | 11/2012 | Ramezani | G06F 21/79 |
| | | | 711/103 |
| 2014/0059273 A1* | 2/2014 | Fujimoto | G06F 3/0661 |
| | | | 711/103 |
| 2016/0188461 A1* | 6/2016 | Takabatake | G06F 3/0679 |
| | | | 711/103 |
| 2017/0249304 A1* | 8/2017 | Mallikarjuna | G06F 16/122 |

FOREIGN PATENT DOCUMENTS

| | | |
|---|---|---|
| TW | 200638197 | 11/2006 |
| TW | 200841669 | 10/2008 |
| TW | 201427173 A | 7/2014 |
| TW | 201631492 A | 9/2016 |

\* cited by examiner

MOBILE DEVICE AND METHOD CAPABLE OF EARLIER DETERMINING THAT A NUMBER OF FILES IN A DIRECTORY OF AN EXTERNAL CONNECTED STORAGE DEVICE IS ABOUT TO FULL

CROSS REFERENCE TO RELATED APPLICATIONS

This application claims priority of U.S. provisional application Ser. No. 62/742,451 filed on 2018 Oct. 8 which is entirely incorporated herein by reference.

BACKGROUND OF THE INVENTION

1. Field of the Invention

The invention relates to an access scheme of a flash memory device, and more particularly to a mobile device and method capable of earlier determining that a number of files in a directory of an externally connected flash memory device is about to full.

2. Description of the Prior Art

Generally speaking, in Microsoft Windows file system, a maximum number of files and sub-directories in a directory is limited to a specific number, i.e. an upper limit of file number of the directory. If the number of files and sub-directories has reached the upper limit, then a new file cannot be established in the directory, and an unexpected error of cannot not copy file will occur. For a mobile device such as a smart phone device, it may employ an externally-connected storage device as a data storage expansion, and the number of files in one directory of the externally-connected storage device is also limited to an upper limit. Thus, if the smart phone device writes a burst of multiple data files into the externally-connected storage device, then there is a great probability that the data writing fails (i.e. file establishment fails) due to that the number of files in a directory has reached an upper limit.

SUMMARY OF THE INVENTION

Therefore one of the objectives of the invention is to provide a scheme and method operating on a mobile device to earlier report the message/information to application software of the mobile device, to solve the problems mentioned above (data writing fails (i.e. file establishment fails)).

According to embodiments of the invention, a method utilized in a mobile device is disclosed. The mobile device employs a mobile operating system and is used to be externally connected to a storage device via a first communication interface. The storage device is used to be coupled to a computer electronic device via a second communication interface. The computer electronic device employs a computer operating system and is used to be externally connected to the storage device. The method comprises: using a memory to store data of a specific application; and operating the specific application to execute a file management operation to perform: sending a file management command corresponding to the file management operation from the mobile device to the flash memory controller via the first communication interface, the file management operation being used for establishing at least one file or at least one sub-directory in a specific directory of a file system of the storage device, the file management command being used for controlling the flash memory controller to access at least one storage page of the flash memory to read and obtain a file entry table corresponding to the specific directory; receiving the file entry table reported by the flash memory controller; finding a plurality of entries used by file(s) and/or sub-directory(s) in the specific directory according to the reported file entry table, to calculate a sum of data amounts of the plurality of entries; and comparing the sum of data amounts with a specific maximum data amount to determine whether to report a failure message or a success message to the specific application wherein the specific application is used for displaying the failure message or the success message for a user.

According an embodiment of the invention, a mobile device employing a mobile operating system and being used to be externally connected to a storage device via a first communication interface is disclosed. The storage device is used to be coupled to a computer electronic device via a second communication interface, and the computer electronic device employs a computer operating system and is used to be externally connected to the storage device. The mobile device comprises a memory and a processor. The memory is used for storing data of a specific application. The processor is coupled to the memory, and is used for operating the specific application to execute a file management operation to perform: sending a file management command corresponding to the file management operation from the mobile device to the flash memory controller via the first communication interface, the file management operation being used for establishing at least one file or at least one sub-directory in a specific directory of a file system of the storage device, the file management command being used for controlling the flash memory controller to access at least one storage page of the flash memory to read and obtain a file entry table corresponding to the specific directory; receiving the file entry table reported by the flash memory controller; finding a plurality of entries used by file(s) and/or sub-directory(s) in the specific directory according to the reported file entry table, to calculate a sum of data amounts of the plurality of entries; and comparing the sum of data amounts with a specific maximum data amount to determine whether to report a failure message or a success message to the specific application wherein the specific application is used for displaying the failure message or the success message for a user.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a scheme and technical solution capable of earlier reporting that a number of files and sub-directories in a directory of a file system is about to full before the number of files and sub-directories in the directory reaches the upper limit of the maximum number, to make the operating system of a mobile device be able to real-time report information whether the number of files/sub-directories in the directory is about to full or has been full when reading, writing, and accessing the files of the directory, and to improve the convenience of user operation and the flexibility of using an externally-connected storage device.

Figure 1:
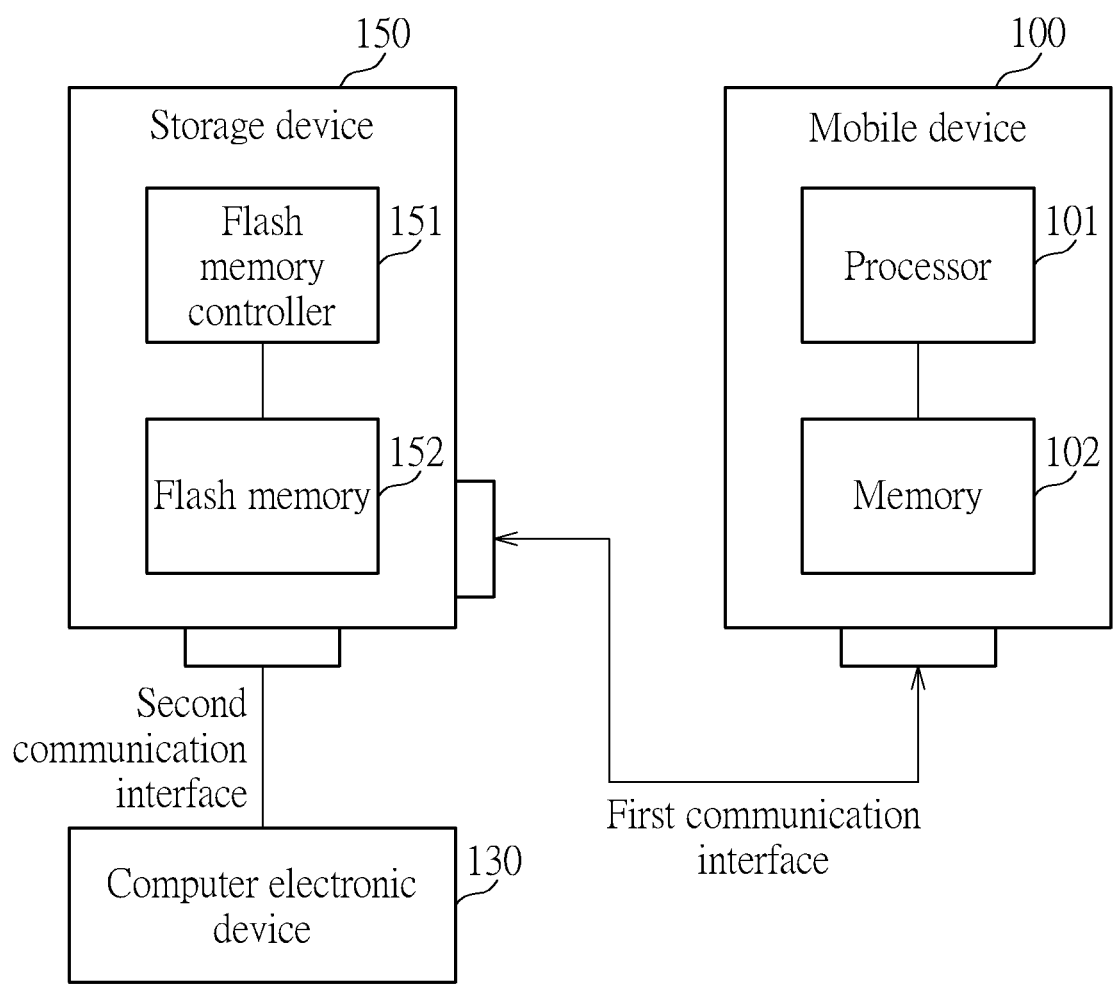
FIG. 1 is a block diagram showing a mobile device to be connected to an externally-connected storage device according to an embodiment of the invention.

Refer to FIG. 1. FIG. 1 is a block diagram showing a mobile device 100 to be connected to an externally-connected storage device 150 according to an embodiment of the invention. The mobile device 100 comprises a processor 101 and a memory 102. The memory 102 is used for storing system code(s) and program code(s). The processor 101 is used for executing the system code(s) and program code(s) and controlling the access of the storage device 150. The processor 101 of mobile device 100 for example can operates a mobile operating system such as Apple iOS, Google Android, Research in Motion BlackBerry OS, Nokia Symbian, Hewlett-Packard webOS (Palm OS) and Microsoft Windows Phone OS. This is not meant to be a limitation of the invention. The storage device 150 for example is a flash memory storage device and comprises a flash memory controller 151 and a flash memory 152. For example, the storage device 150 may be a solid-state drive, thumb drive, or flash drive; this is not intended to be a limitation. The flash memory controller 151 is coupled to the flash memory 152 and is used for writing, reading, or accessing data of the flash memory 152 according to instruction(s) of mobile device 100 to make the storage device 150 be as a data storage expansion of mobile device 100.

The mobile device 100 is externally coupled to the storage device 150 via a first communication interface of storage device 150. The first communication interface for example is a wired communication interface such as the communication interface of lightning connector (but not limited). In addition, the first communication interface can be also a wireless communication interface. This is not meant to be a limitation of the invention.

The storage device 150 further comprises a second communication interface such as the USB interface. The storage device 150 can be arranged to communicate with a computer electronic device via the second communication interface. The computer electronic device for example is a portable computer electronic device such as a notebook computer. The electronic device operates/employs a computer operating system of Windows OS or Macintosh OS.

The user can operate the mobile device 100 to activate and execute specific application/software such as a camera application/software or other application/software. The memory 102 is used for recording and storing data of the specific application/software. The processor 101 is arranged to access the data of the specific application/software of memory 102 to operate the specific application/software. When the user for example operate the mobile device 100 to read a file which has been already stored within the storage device 150 or to write and establish a new file in the storage device 150, the processor 101 is arranged to use the specific application to execute a file management operation such as fopen. The file management operation is arranged to send a file management command corresponding to the file management operation from the mobile device 100 to the flash memory controller 151 of storage device 150 via the first communication interface. The file management operation for example is used by the specific application to execute an operation of establishing at least one file or at least one sub-directory in a specific directory of a file system of storage device 100. The file management command is used to control the flash memory controller 151 to access at least one storage page of flash memory 152 to read and obtain a file entry table corresponding to the specific directory wherein the file entry table may be called as a directory table.

In the system of storage device 150, information of the filenames, filename extensions, and other information of each file or each sub-directory included within one directory is stored at a corresponding entry within a corresponding directory entry table. For each entry, an entry actually stores a corresponding data amount (e.g. 32 bytes; but bot limited) of the above-mentioned information of a file or a sub-directory. That is, storing information (e.g. filenames and other information) of a file or a sub-directory needs to occupy a data amount of 32 bytes. If a file or a sub-directory has a long filename, then storing information of such file or sub-directory needs to occupy more bytes. For example, if the filename length is eight characters, then storing information of such filename length needs to occupy a data amount of 32 bytes. If the filename length is nine characters, then storing information of such filename length needs to occupy a data amount of 64 bytes. This operation is similar to other different filename lengths, and is not detailed for brevity. The flash memory 152 of storage device 150 for example is arranged to store contents of all entries corresponding to all files and sub-directories in a specific directory, i.e. all content information in the directory entry table of the specific directory, into one or more storage pages. For example, if a storage page can be used to store data of 512 bytes, then it is necessary to use more storage pages to store the information of entries once the number of files and sub-directories in the specific directory becomes larger.

When the flash memory controller 151 receives the file management command sent by the mobile device 100, the flash memory controller 151 is arranged to read information content of all entries of a directory entry table of the specific directory from one or more corresponding storage pages according to one or more addresses indicated by the file management command, and to return/send the information content of all the entries back to the file management operation of the processor 101 of mobile device 100 via the first communication interface. The operation of sending the information content of all the entries of a directory entry table corresponding to a directory may be also called as a parse operation for the directory entries. If it is needed to use more storage pages to record the information content of all the entries of a directory entry table, then a waiting time period required to complete the parse operation will become longer. Generally, a maximum number of files and sub-directories included within a directory is limited. When the number of files and sub-directories currently included within a directory is full, a conventional scheme can only store a new file into another different directory if such new file is to be established into the directory originally.

To solve the problems of performance degradation caused by the a too long waiting time period required to complete the parsing operation, the invention provides a technical solution of using the processor 101 to operate the file management operation to compare a total data amount occupied by all the entries of the directory entry table with a data amount corresponding to an upper limit of the maximum entry number when each time the processor 101 operates the specific application/software to execute the file management operation to obtain contents of the directory entry table of the specific directory reported by the storage device 100. The data amount of the upper limit of the maximum entry number means a upper limit of data amounts. The processor 101 is arranged to determine whether to store a new file to be established into the specific directory or to store such new file into another directory or a sub-directory. The operations of determination, storing the file into the another directory or creating a new sub-directory can be completed automatically by the predetermined setting of a user. For example, if the user selects a predetermined setting or an auto storing setting, the file management operation may be arranged to automatically select one of sub-directory(s) in the specific directory and establish the new file into such selected sub-directory when determining that the number of files in the specific directory is about to full. Alternatively, the file management operation may be arranged to automatically create a new sub-directory in the specific directory and to establish the new file into the created sub-directory. Alternatively, the file management operation may automatically store the new file into another different directory. When the user selects a manual setting, the file management operation may be arranged to report that a number of files within a specific directory is about to full when determining that the number of files is about to full so as to make that a specific application can generate a display picture and a corresponding button to prompt a user and provide input selections for the user.

Figure 2:
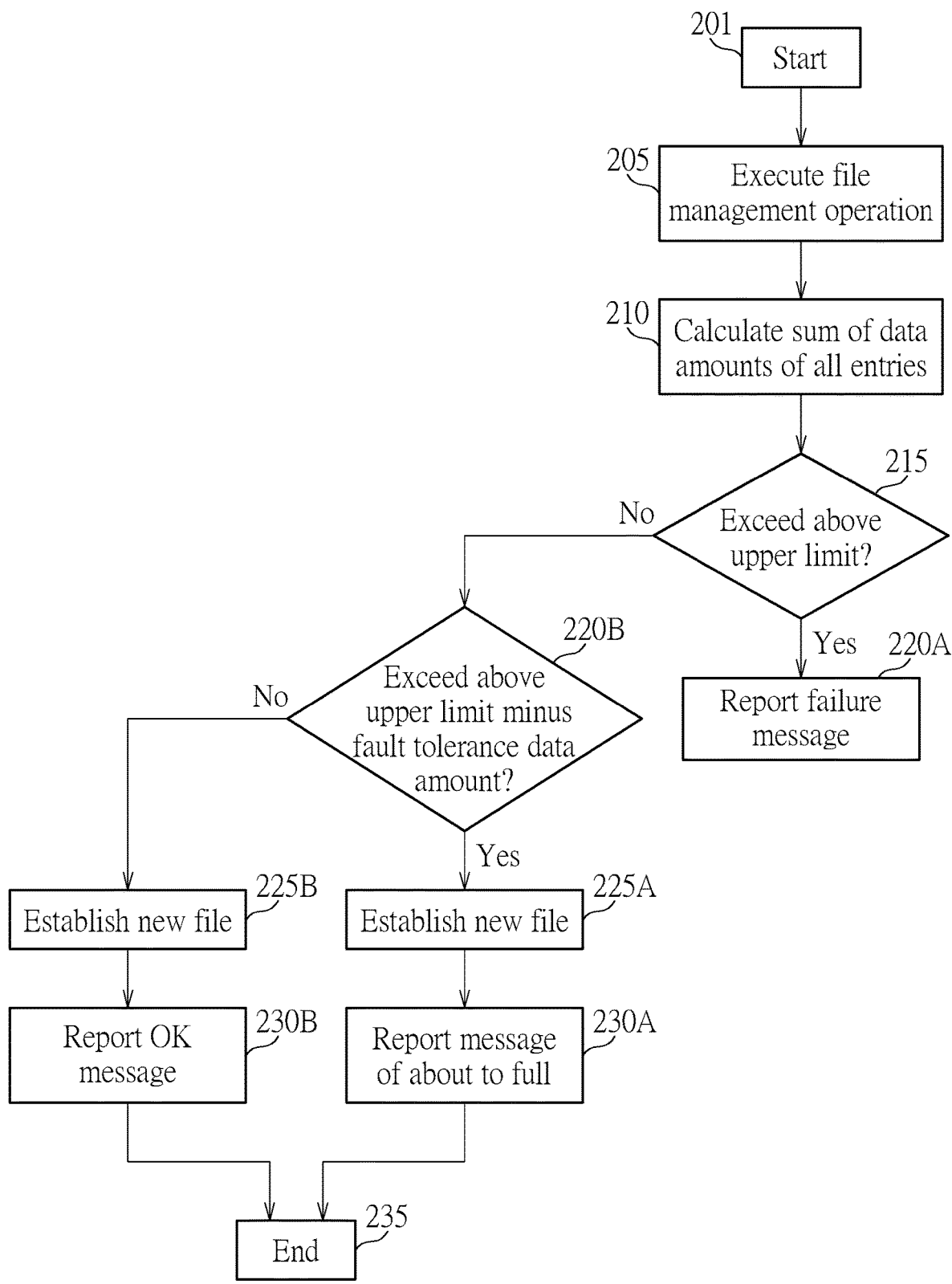
FIG. 2 is a flowchart diagram of the file management operation executed by the processor of mobile device as shown in FIG. 1 according to an embodiment of the invention.

Refer to FIG. 2. FIG. 2 is a flowchart of the file management operation executed by the processor 101 of mobile device 100 as shown in FIG. 1. The description of steps is described in the following.

In Step 205, the processor 151 is arranged to operate a specific application/software to execute a file management operation such as fopen. The file management operation is arranged to send a file management command from the mobile device 100 to the flash memory controller 151 of storage device 150 via the first communication interface. If the first communication interface is a wired communication, then storage device 150 is coupled to the mobile device 100 via the wired communication interface. In addition, when the flash memory controller 151 receives the file management command, the flash memory controller 151 is arranged to read out and obtain the contents of all entries of the directory entry table corresponding to the specific directory according to one or more corresponding to storage pages of address(es) specified by the file management command, and then is arranged to send return back the contents of all the entries to the filer management operation of the processor 101 of the mobile device 100 via the first communication interface.

In step 210, the processor 101 of mobile device 100 is arranged to operate the specific file management operation to obtain the contents of all entries of all files and sub-directories in the specific directory, and then accordingly to calculate the sum of data amounts of the all entries occupied by the files and sub-directories based on the obtained contents. For example, the sum of data amounts can be represented by units of one byte. Each entry can be called a directory entry, DIR entry, or file description block (FDB), and is associated with a specific data amount such as 32 bytes. For example, the filename of a file can be stored by using the data amount of at least one entry, i.e. at least 32 bytes.

A directory table is a file having a specific type and is used to represent a directory. In the directory table, each file or directory stored in the directory is represented by using an entry having 32 bytes. Each entry records a file/directory's information comprising filename, extension, attribute, date and time of creation, address of first cluster of data of the file/directory, the data amount of the file/directory, and so on. All directory tables for example are stored in a data region of the flash memory of the storage device, e.g. one or more storage pages.

In Step 215, the processor 101 of mobile device 100 is arranged to operate the specific file management operation to determine whether the sum of data amounts of the currently occupied entries is larger than a specific maximum data amount (i.e. the data amount of upper limit of the maximum entry number). The value of the specific maximum data amount can be designed and configured as different in different file systems such as FAT/FAT32/exFAT file systems. If the sum of data amounts is smaller than the specific maximum data amount, the flow proceeds to Step 220B. Otherwise, if the sum of data amounts is larger than or equal to the specific maximum data amount, then the flow proceeds to Step 220A.

It should be noted that in this embodiment the specific file management operation of the invention is arranged to compare the sum of data amounts of entries occupied by all files and sub-directories with a data amount of an upper limit of the maximum entry number (i.e. comparison of data amounts of entries) since a file may have a long filename and thus equivalently occupy a data amount of multiple entries. However, in other embodiments, the specific file management operation of the invention can be also arranged to compare a total number of entries occupied by the all files and sub-directories with an upper limit of the maximum entry number, i.e. the comparison of numbers of entries. This also obeys the spirit of the invention.

In Step 220A, the file management operation is arranged to report a failure message or information to the specific application/software running on the mobile device 100 since the sum of data amounts of all entries occupied by all files and sub-directories in the specific directory have been larger than or equal to the configured specific maximum data amount. The specific application/software can be used to display the failure message (e.g. a failure/error message of writing a file into the specific directory) on the screen picture for the user operating the mobile device 100.

In Step 220B, the processor 101 of mobile device 100 is arranged to operate the specific file management operation to determine whether the sum of data amounts exceeds above a value of the specific maximum data amount minus a specific fault tolerance data amount such as the data amount of 500 bytes. If the sum of data amounts exceeds above the value of specific maximum data amount minus a specific fault tolerance data amount, then the flow proceeds to Step 225A. Otherwise, if the sum of data amounts does not exceed above the above-mentioned data amount, then the flow proceeds to Step 225B.

In Step 225A, the processor 101 of mobile device 100 is arranged to operate the specific file management operation to establish a new file in the specific directory. Further, in Step 225B, the processor 101 of mobile device 100 is arranged to operate the specific file management operation to establish a new file in the specific directory.

In Step 230A, since the processor 101 of mobile device 100 operates the specific file management operation to report the message/information, which indicates that the available entries in the specific directory are about to full, to the specific application, the specific application thus can display such message/information on the screen picture for the user operating the mobile device 100.

In Step 230B, the processor 101 of mobile device 100 is arranged to operate the specific file management operation to report OK (success) message/information to the specific application, and the specific application can display the OK (success) message/information on the screen picture for the user operating the mobile device 100.

By using the data amount comparison mentioned in Step 215 and Step 220B, if it is needed to write contents of a burst of multiple files or sub-directories into a specific directory based the user's request, then the mobile device 100 can earlier report a message, which indicates that the number of files established in the specific directory is about to full, to the user, so that the user may select other directory or its sub-directory to write the file into the selected directory/sub-directory. Thus, it is hard to happen that a file cannot be written into the flash memory.

It should be noted that the specific maximum data amount is different file system such as FAT/FAT32/exFAT files systems may be configured as different. For example, in the FAT/FAT32 file system, the specified maximum data amount is equal to 0X200000 bytes, and in the exFAT file system the specific maximum data amount is equal to 0X10000000 bytes. However, this is not meant to be a limitation of the invention.

Figure 3:
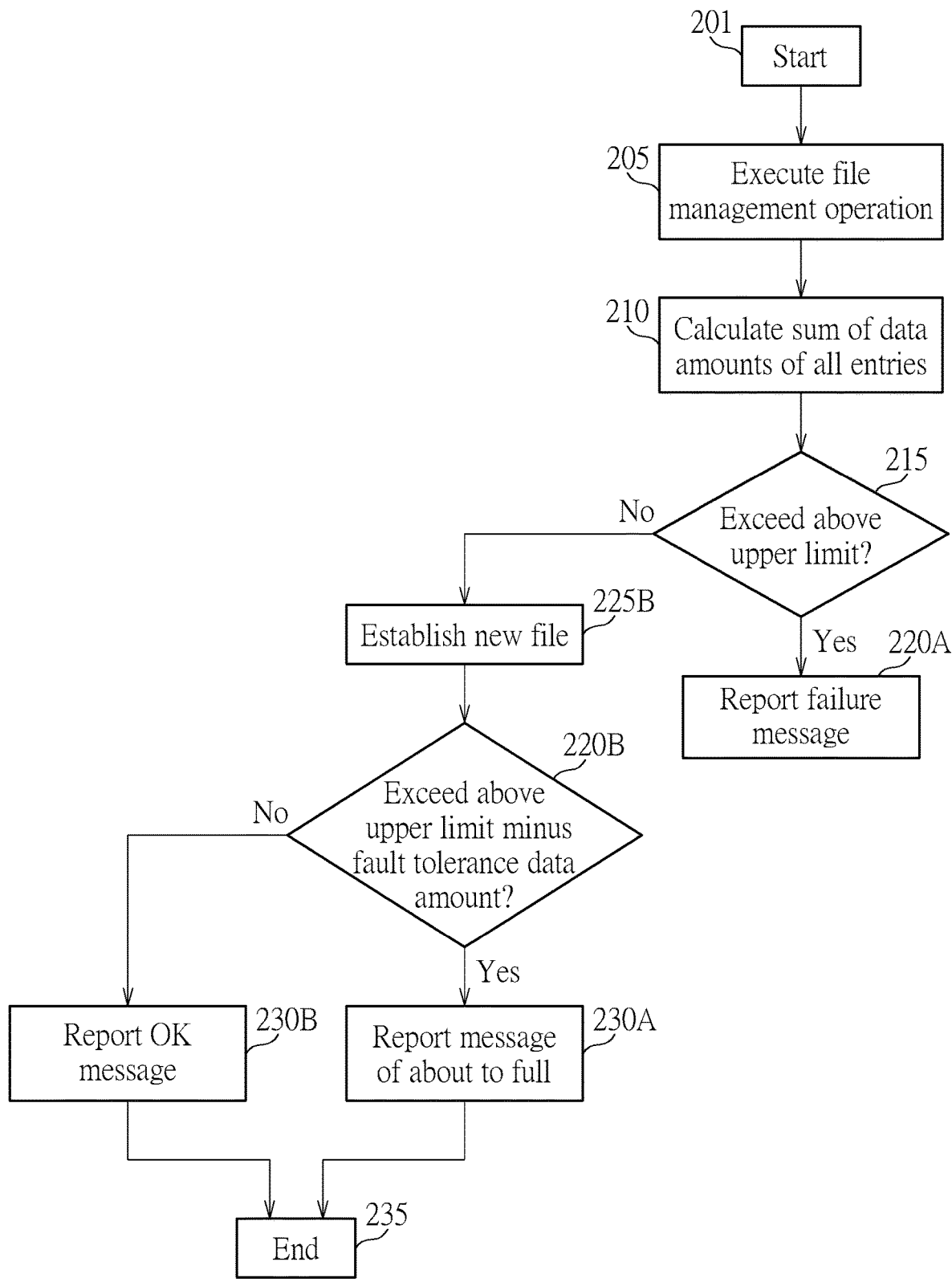
FIG. 3 is a flowchart diagram of the file management operation executed by the processor of mobile device as shown in FIG. 1 according to another embodiment of the invention.

In other embodiment, the step of establishing a new file in a specific directory can be exchanged with the step of determining whether the sum of data amounts of all the occupied entries exceeds above the value of the specific maximum data amount minus the fault tolerance data amount. For instance, FIG. 3 shows the flowchart according to this embodiment of the invention. When determining that the sum of data amounts is not larger than or not equal to the specific maximum data amount, the flow proceeds to the step of establishing a new file in the specific directory and then proceeds to the step of determining whether to report this message earlier. The detailed descriptions of the steps are not described for brevity.

Figure 4:
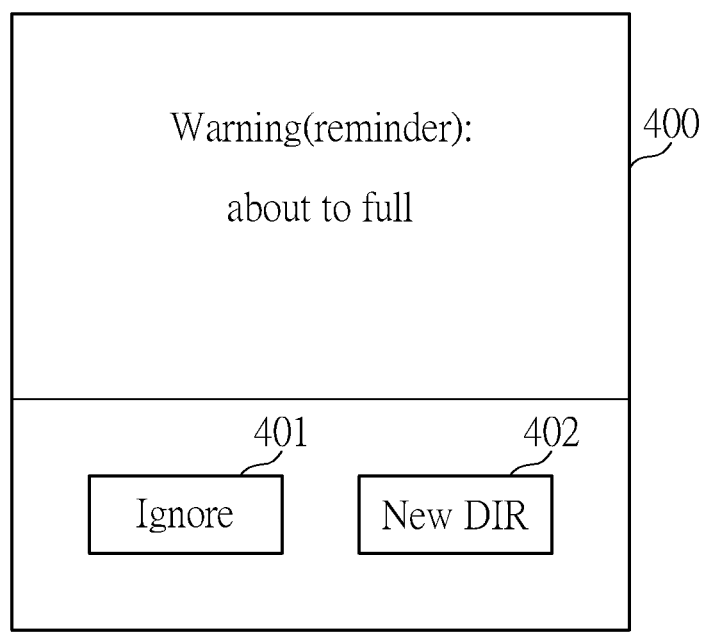
FIG. 4 is a diagram of a mobile device of FIG. 1 operating a specific application to display reminder information on a screen picture for a user according to an embodiment of the invention.

Further, when the processor 101 of mobile device 100 reports the message/information, which indicates that the available entries in the specific directory are about to full, to the specific application, the specific application can be arranged to display a prompt message for the user. For example, the specific application can display the screen picture of FIG. 4 for the user. As shown by FIG. 4, the screen picture 400 displayed by the specific application shows warning/reminder information for giving a prompt for the user wherein the warning/reminder information indicates that the number of files and sub-directories in a specific directory is about to full. The screen picture 400 of the specific application can be configured to comprise a message content and for example two buttons 401 and 402, and the message content can be displayed by a text to prompt the user that information of the number of files and sub-directories in a specific directory being reaching an upper limit. In addition, the specific application may be arranged to use a voice message to prompt the user. The button 401 (Ignore) is used to ignore the prompted displayed/voice message. If the user selects and presses the button 401, then the specific application for example is arranged to close or turn off the prompted screen picture 400. The button 402 (New DIR) is used to establish a directory or create a sub-directory to establish a new file in the established/created new directory/sub-directory. If the user selects and presses the button 402, then the specific application can turn on or activate another screen picture so that the user can select a directory for saving the file; alternatively, the user may further create a new directory in such screen picture.

Further, in other embodiment, if the sum of data amounts of occupied entries is about to reach the upper limit indicated by a maximum entry number, then the specific file management operation operated by the processor 101 of mobile device 100 can also automatically generate or create a new directory or a new sub-directory without providing a prompt message/information/warning for the user. This can be executed by the setting of the specific application which is configured by the user.

Further, the value of fault tolerance data amount can be configured or modified by the user. In addition, by appropriately determining the value of fault tolerance data amount, multiple files each having a larger data amount and originally are to be stored into a single one directory can be separated and respectively stored into multiple different directories or multiple different sub-directories so that the it may be not needed for the mobile device 100 to parse too many files in a directory. The mobile device 100 does not require waiting for a longer data parse time period, and the performance of mobile device 100 can be significantly improved. In addition, for the mobile device of the invention, the mobile device is arranged to operate a specific application to trigger a file management operation to use the standard of Microsoft's Windows file system to determine whether the number of entries in a directory (to be accessed) of the externally-connected storage device is about to reach an upper limit indicated by the maximum file number.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method utilized in a mobile device, the mobile device employing a mobile operating system and being used to be externally connected to a storage device via a first communication interface, the storage device being used to be coupled to a computer electronic device via a second communication interface, the first communication interface of the storage device being different from the second communication interface of the storage device, the computer electronic device employing a computer operating system and being used to be externally connected to the storage device, and the method comprises:

using a memory to store data of a specific application; and
operating the specific application of the mobile device to execute a file management operation of the mobile operating system to perform:
sending a file management command corresponding to the file management operation from the mobile device to a flash memory controller of the storage device via the first communication interface of the storage device, the file management operation being used for establishing at least one file or at least one sub-directory in a specific directory of a file system of the storage device, the file management command being used for controlling the flash memory controller to access at least one storage page of the flash memory to read and obtain a file entry table of the specific directory from the flash memory; an entry in the file entry table of the specific directory is used to record specific information having a specific number of bytes occupied by the entry, and the specific information comprises at least one portion of a filename or filename extension of a file or a sub-directory included within the specific directory;

using the mobile device, which employs the mobile operating system different from the computer operating system of the computer electronic device and different from the file system of the storage device, to receive the file entry table of the specific directory reported from the flash memory controller, the file entry table of the specific directory of the storage device being transmitted from the flash memory controller into the mobile operating system of the mobile device;

using the mobile device to find a plurality of entries, which are from the reported file entry table of the specific directory and are associated with file(s) and/or sub-directory(s) in the specific directory, to calculate a sum of data amounts occupied by information of the plurality of entries in the reported file entry table of the specific directory; and using the mobile device to compare the sum of data amounts with a specific maximum data amount to establish a new file in the specific directory and to determine whether to report a failure message or a success message to the specific application wherein the specific application is used to display the failure message or the success message for a user.

2. The method of claim 1, wherein the specific maximum data amount is an upper limit of data amounts which can be used by the file(s) and/or sub-directory(s) in the specific directory, and the step of comparing the sum of data amounts with the specific maximum data amount to determine whether to report the failure message or the success message to the specific application comprises:

determining whether the sum of data amounts is larger than the upper limit of data amounts;

reporting the failure message from the file management operation to the specific application if the sum of data amounts is larger than the upper limit of data amounts;

determining whether the sum of data amounts is smaller than a value of a second data amount if the sum of data amounts is smaller than the upper limit of data amounts, the second data amount being equal to the upper limit of data amounts minus a fault tolerance data amount;

using the file management operation to establish the at least one file in the specific directory and return the success message to the specific application if the sum of data amounts is smaller than the second data amount; and using the file management operation to establish the at least one file in the specific directory and return a message that the specific directory is about to full back to the specific application if the sum of data amounts is larger than the second data amount.

3. The method of claim 2, wherein the upper limit of data amounts is configured to be different in different file systems.

4. A mobile device employing a mobile operating system and being used to be externally connected to a storage device via a first communication interface, the storage device being used to be coupled to a computer electronic device via a second communication interface, the first communication interface of the storage device being different from the second communication interface of the storage device, the computer electronic device employing a computer operating system and being used to be externally connected to the storage device, and the mobile device comprises:

a memory, used for storing data of a specific application; and a processor, coupled to the memory, used for operating the specific application of the mobile device to execute a file management operation of the mobile operating system to perform:

sending a file management command corresponding to the file management operation from the mobile device to a flash memory controller of the storage device via the first communication interface of the storage device, the file management operation being used for establishing at least one file or at least one sub-directory in a specific directory of a file system of the storage device, the file management command being used for controlling the flash memory controller to access at least one storage page of the flash memory to read and obtain a file entry table of the specific directory from the flash memory; an entry in the file entry table of the specific directory is used to record specific information having a specific number of bytes occupied by the entry, and the specific information comprises at least one portion of a filename or filename extension of a file or a sub-directory included within the specific directory;

using the mobile device, which employs the mobile operating system different from the computer operating system of the computer electronic device and different from the file system of the storage device, to receive the file entry table of the specific directory reported from the flash memory controller, the file entry table of the specific directory of the storage device being transmitted from the flash memory controller into the mobile operating system of the mobile device;

using the mobile device to find a plurality of entries, which are from the reported file entry table of the specific directory and are associated with file(s) and/or sub-directory(s) in the specific directory, to calculate a sum of data amounts occupied by information of the plurality of entries in the reported file entry table of the specific directory; and using the mobile device to compare the sum of data amounts with a specific maximum data amount to establish a new file in the specific directory and to determine whether to report a failure message or a success message to the specific application wherein the specific application is used to display the failure message or the success message for a user.

5. The mobile device of claim 4, wherein the specific maximum data amount is an upper limit of data amounts which can be used by the file(s) and/or sub-directory(s) in the specific directory, and the processor is arranged to operate the specific application to perform:

determining whether the sum of data amounts is larger than the upper limit of data amounts;

reporting the failure message from the file management operation to the specific application if the sum of data amounts is larger than the upper limit of data amounts;

determining whether the sum of data amounts is smaller than a value of a second data amount if the sum of data amounts is smaller than the upper limit of data amounts, the second data amount being equal to the upper limit of data amounts minus a fault tolerance data amount;

using the file management operation to establish the at least one file in the specific directory and return the success message back to the specific application if the sum of data amounts is smaller than the second data amount; and using the file management operation to establish the at least one file in the specific directory and return a message that the specific directory is about to full back to the specific application if the sum of data amounts is larger than the second data amount.

6. The mobile device of claim 5, wherein the upper limit of data amounts is configured to be different in different file systems.

* * * * *